(12) United States Patent
Hanning

(10) Patent No.: US 6,471,282 B2
(45) Date of Patent: Oct. 29, 2002

(54) RELIABLE RETRACTABLE PROTECTIVE COVER ASSEMBLY

(76) Inventor: John Hanning, 4014 Everts St., San Diego, CA (US) 92109

(*) Notice: Subject to any disclaimer, the term of this patent is extended or adjusted under 35 U.S.C. 154(b) by 0 days.

(21) Appl. No.: 09/817,860

(22) Filed: Mar. 26, 2001

(65) Prior Publication Data

US 2002/0135199 A1 Sep. 26, 2002

(51) Int. Cl.⁷ .................................................. B60P 7/04
(52) U.S. Cl. .................. 296/100.12; 296/105; 296/165
(58) Field of Search ....................... 296/100.11, 100.12, 296/104, 105, 98, 165, 100.17, 100.18

(56) References Cited

U.S. PATENT DOCUMENTS

| | | | | |
|---|---|---|---|---|
| 3,606,448 A | * | 9/1971 | Walker | 296/105 |
| 3,874,721 A | * | 4/1975 | Tuggle | 296/105 |
| 3,901,548 A | * | 8/1975 | Seaman, Jr. | 296/100.18 X |
| 4,289,346 A | * | 9/1981 | Bourgeois | 296/105 |
| 4,611,848 A | * | 9/1986 | Romano | 296/98 |
| 4,889,381 A | * | 12/1989 | Tamblyn et al. | 296/98 |
| 5,005,896 A | * | 4/1991 | Li | 296/105 X |
| 6,257,260 B1 | * | 7/2001 | Phillips | 296/105 X |

FOREIGN PATENT DOCUMENTS

FR            1469581       *    1/1967 .................. 296/105

OTHER PUBLICATIONS

Mounting bracket instructions, one page, undated.*

* cited by examiner

Primary Examiner—Dennis H. Pedder

(74) Attorney, Agent, or Firm—Oppenheimer, Wolff & Donnelly LLP

(57) ABSTRACT

A reliable retractable and extendable protective cover assembly for covering the bed of a pick-up truck includes a pair of elongated guide tracks and rollers on each of the sides of the bed. The guide tracks are positioned in parallel formation on either side of the bed, and the rollers are located within the tracks. Furthermore, the guide tracks are located within the area on the bed that is to be covered. This positioning of the guide tracks and rollers reduces the risk of damage to the track-roller assembly in case of a hazard in the surrounding environment. A plurality of frame members are in guided engagement with the rollers. Expansion brackets are secured at the top and bottom of each of the frame members. Preferably the top bracket is fixedly secured to the frame member, whereas the bottom bracket moves along the length of the frame member. The frame members communicate with each other through linkages, the linkages being attached to the expansion brackets on two sides thereof. This balanced force applied to the lower bracket prevents jamming in the assembly during extension or retraction of the reliable protective cover assembly. Upon initiating an automatic or a manual process for activating the reliable protective cover assembly, the roller motion along the tracks causes the lower bracket of each frame member to move along the length of the frame member producing a relative displacement, that is devoid of jamming, as the frame members move towards or away from each other.

7 Claims, 3 Drawing Sheets

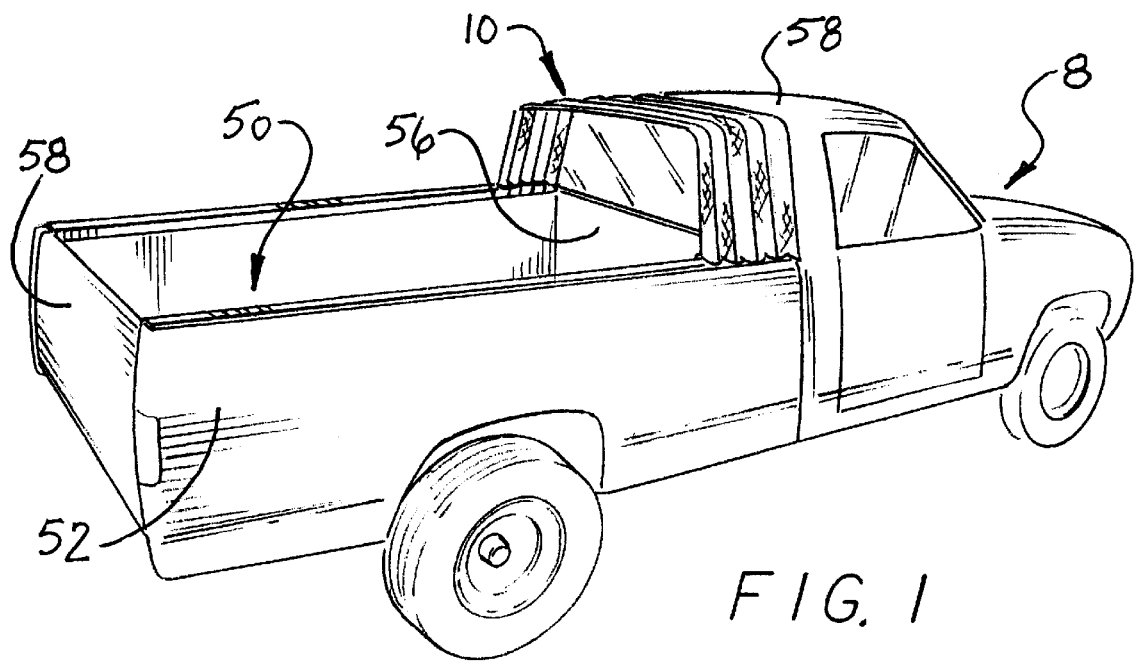
FIG. 1
FIG. 2
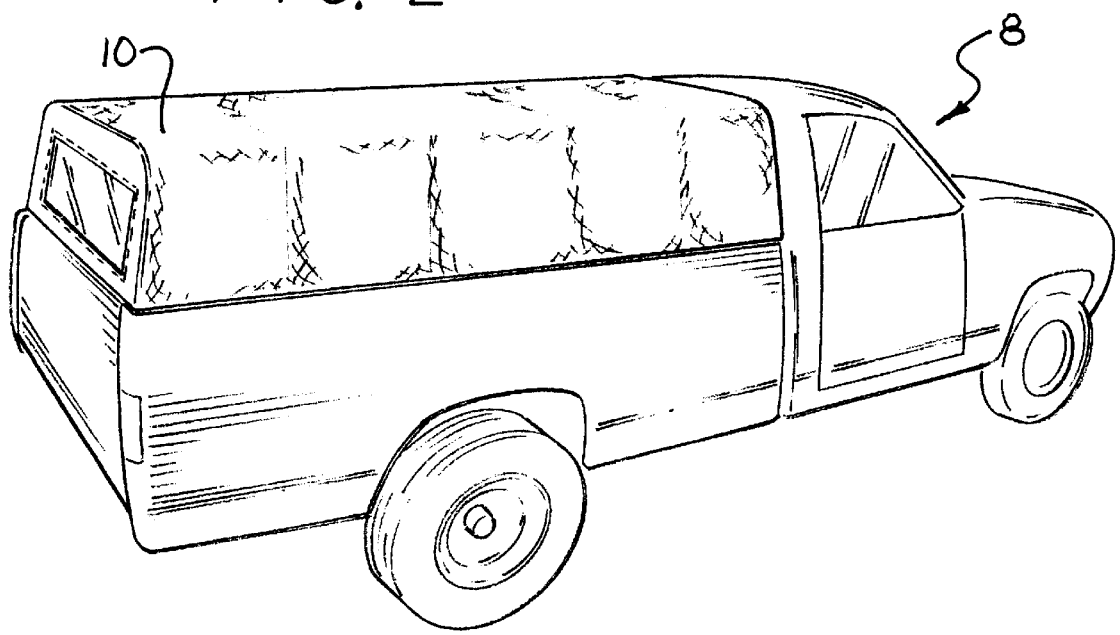

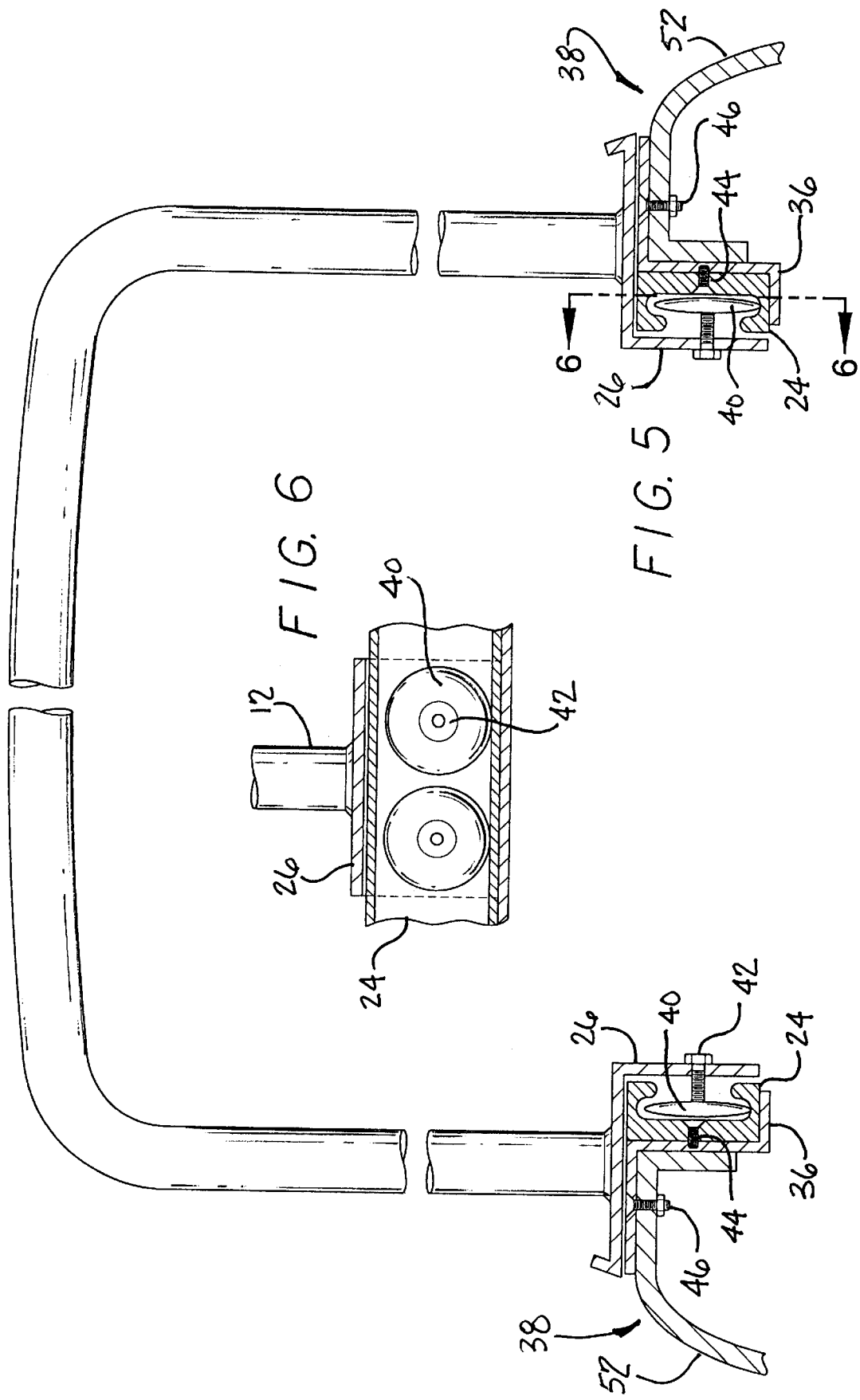

RELIABLE RETRACTABLE PROTECTIVE COVER ASSEMBLY

FIELD OF THE INVENTION

This invention relates generally to protective covers for enclosing storage areas such as a bed of a pick-up truck, and, more specifically, is directed to a retractable and extendable protective cover assembly that may be activated for movement to a retracted position where a majority of the storage area is exposed and an extended position where substantially all of the area is covered and protected.

BACKGROUND OF THE INVENTION

In the handling of goods in connection with storage areas, such as the bed of a pick-up truck, it is desirable to have overhead access to these areas in order that the goods may be handled more efficiently. Where the vehicle is small, such as a pick-up truck, a person loading or unloading goods from the bed of the truck can accomplish this task more easily if the pick-up trucks bed is not covered. In order to load or unload a covered truck bed, the person accomplishing this task will typically bend over during such loading and unloading operations. Loading and unloading, therefore, is typically a slow procedure when the truck bed is covered and the personnel must suffer the disadvantage of working under the low overhead of the cover. Furthermore, in order to protect the goods contained in the bed of the vehicle from damage by wind, rain, etc., the truck should be provided with a protective cover that encloses the bed of the vehicle.

Where trucks are loaded with heavy goods, it is frequently desirable to utilize a crane in order to accomplish loading and unloading operations. Where a crane is to be utilized it is, of course, desirable that the truck bed be uncovered to facilitate overhead clearance for manipulation of the goods with the crane. In addition, it is usually desirable that the goods be provided with some sort of protective covering to insure arrival of the goods in excellent condition at the delivery site. Thus it is necessary that the goods be provided with a protective cover that is secured in place about the goods and truck bed in order to prevent contamination or deterioration during transporting.

Some known prior art arrangements involve the use of flexible protective covers, such as canvases and plastic wrapping without supporting frame members. However, these tend to deteriorate very rapidly during transporting due to wind induced movement and buffeting thereof. Obviously, deterioration of flexible covers in transit adds materially and adversely to the expenses of transportation.

Other known prior arrangements involve collapsible and extendable protective cover assembly incorporating a plurality of substantially rigid segments, that are coupled to rollers placed inside guide tracks, thereby making them movable so as to expose or cover the storage area. The collapsing or the extending action of the rigid segments is achieved by a linkage assembly between the rigid segments. Two disadvantages that occur with such known assembly are: (a) the tracks are located on the upwardly extending sides of the vehicle thereby making the track and roller assembly susceptible to damage due to environmental hazards (e.g., flying objects, accidents due to loading and unloading, etc.); and (b) the linkage mechanism is susceptible to jamming due to the application of unbalanced force, thereby interfering with the collapsible or extendible action of the rigid segments.

SUMMARY OF THE INVENTION

It is therefore a primary object of the present invention to provide a reliable, retractable and extendable protective cover assembly that is readily adaptable for use in conjunction with storage areas, such as the storage beds of vehicles.

Another feature of the present invention concerns the provision of a retractable and extendable protective cover assembly that is capable of being retracted in order to expose a majority of the storage area involved and is extendable to a position where substantially all of the storage area is protectively enclosed.

Another feature of the present invention concerns the inclusion of a mechanism that prevents jamming in the linkages between the rigid segments due to an application of an unbalanced force.

Another feature of the present invention concerns the proper positioning of the track-roller assembly so as to minimize damage to the assembly due to environmental hazards. Another feature of the present invention concerns the ease of removal and storage of the cover assembly.

In one embodiment of the present invention, a reliable retractable and extendable protective cover assembly for storage areas may incorporate a plurality of frame members disposed in a substantial parallel relation to each other. In the retracted position of the cover assembly the various frame members will be positioned in nesting relation and most of the storage area on the bed of a pick-up struck will be exposed. In the extended position of the cover assembly the various frame members will be positioned in a manner as to cover the storage area on the bed of a pick-up truck.

The reliable retractable and extendable protective cover assembly comprises a pair of guide tracks that are disposed in a substantially parallel formation relative to each other. These guide tracks extend along the length of the sides of a truck bed. Furthermore, these tracks are preferably located inside and adjacent the top of the sides of the truck bed. This provides protection to the tracks from environmental hazards external to the pick-up truck. Pairs of rollers or wheels are positioned inside the guide tracks, with each of the frame members being in guided engagement with rollers on both the tracks via frame support bracket assemblies. The frame members are provided with a fixedly secured expansion bracket and a movable adjacent bracket. The movable expansion bracket for each frame member has two pivot points, one extending toward the front of the truck and the other extending toward the rear of the truck from the frame member. There is a linkage arrangement between the frame members. In one embodiment of the linkage arrangement, a first linkage is connected at one end to the fixedly secured bracket of a first frame member and connected at the other end to a movable bracket of a second frame member; the second linkage is connected at one end to the fixedly secured bracket of a third frame member and at the other end to the movable bracket of the second frame member. Furthermore, the first, second and third frame members are adjacent to each other. This balanced arrangement of the linkages between neighboring frame members serves to reduce the chance of jamming in the linkages which might otherwise occur due to an application of unbalanced forces to the brackets of the frame members.

When the reliable retractable and extendible cover assembly is activated, the roller motion along the tracks produces an angular displacement in the linkages causing the movable bracket of each frame member to move along the length of the frame member. This balanced motion of the movable bracket with its two pivot points produces a linear displacement, that is devoid of jamming, between the adjacent frame members in a retractable or extendable manner over the bed of the truck.

Furthermore, fasteners such as pins or bolts are provided to secure the frame support brackets to the tracks at each end of the tracks, to keep the cover assembly locked in an extended or retracted position. Upon removing the fasteners the cover assembly may be easily removed for purposes of storage.

Other and further objects, advantages and features of the invention will become apparent following a consideration of the drawings and the following detailed description of the preferred embodiments.

BRIEF DESCRIPTION OF THE DRAWINGS

FIG. 1 is a perspective view of a pick-up truck incorporating a reliable retractable and extendable protective cover assembly in a retracted position;

FIG. 2 is a perspective representation of a pick-up truck incorporating a reliable retractable and extendable protective cover assembly in an extended position;

FIG. 5 is a view of one of the frame members of the cover assembly showing rollers on both sides of the frame member, guide tracks, and frame support bracket assemblies connecting the rollers to the frame member;

FIG. 6 is a fragmentary cross-sectional view illustrating two rollers in guided engagement via a frame support bracket assembly with one end of a frame member.

DETAILED DESCRIPTION OF THE PREFERRED EMBODIMENTS

Figure 3:
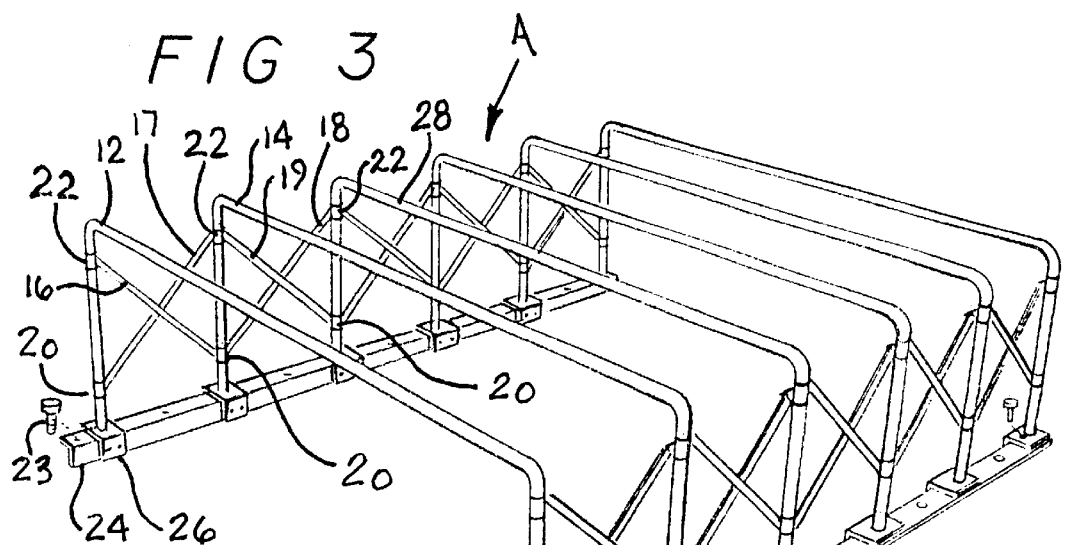
FIG. 3 is a perspective view of the reliable retractable and extendable protective cover assembly comprising of a plurality of frame members, linkages, frame support bracket assemblies, and guide tracks, with the covering sheet material removed.

Now referring to the drawing of FIG. 1, there is depicted a pick-up truck 8 having a bed portion 50 defining an elongated, generally rectangular area to be protected from the elements. The truck bed 50 is defined by side wall members 52, a front end wall member 56 and a rear wall 58. The rear wall, especially in pick-up truck type structures, is generally pivotable downwardly, and is generally referred to as a tailgate. The side wall members 52 define generally flat upper surfaces that extend the length of the bed structure. The truck bed is also defined by a substantially flat bed portion (not shown) on which goods or objects rest during transportation and storage. A reliable retractable and extendable protective cover assembly 10 is shown in a retracted position towards the passenger compartment 58 of the pick-up truck 8.

In FIG. 2, the reliable retractable and extendable protective cover assembly 10 is shown in an extended position covering the bed portion 50 of the pick-up truck. A cloth canopy is shown as part of the cover assembly. In this extended position, the cover assembly completely covers the bed of the truck thereby providing protection to any goods being transported.

Referring to FIG. 3, a plurality of frame members are shown that comprise the frame position of the reliable retractable and extendable protective cover assembly 10. Specifically, referring to frame members 12, 14, and 28, a set of linkages such as 16 and 18 are shown linking the frame members 12, 14, and 28. The linkages 16 and 18 are connected at one end to fixed brackets 22 of frame members 12 and 28 respectively. The other end of each of the linkages 16 and 18 is connected to a movable bracket 20 on the frame member 14. A symmetrical arrangement exists for the adjacent bracket 22 of the frame member 14. For example, linkages 17 and 19 are connected at one end to a fixed bracket 22 of frame member 14. The other ends of the linkages 17 and 19 are connected to movable brackets 20 of frame members 12 and 28, respectively. This arrangement of the linkages between neighboring frame members reduces the chance of jamming in the linkages which might otherwise arise from an application of unbalanced forces to the movable brackets of the cover assembly.

Each of the frame members is connected to a frame support bracket assembly 26 at each end of the frame members. The frame support bracket assembly 26 is in turn connected to rollers or wheels 40 (as detailed in FIGS. 5 and 6). The rollers 40 are movably constrained within guide tracks 24. Preferably, the guide tracks are made of aluminum, however, any sturdy material can be used.

Figure 4:
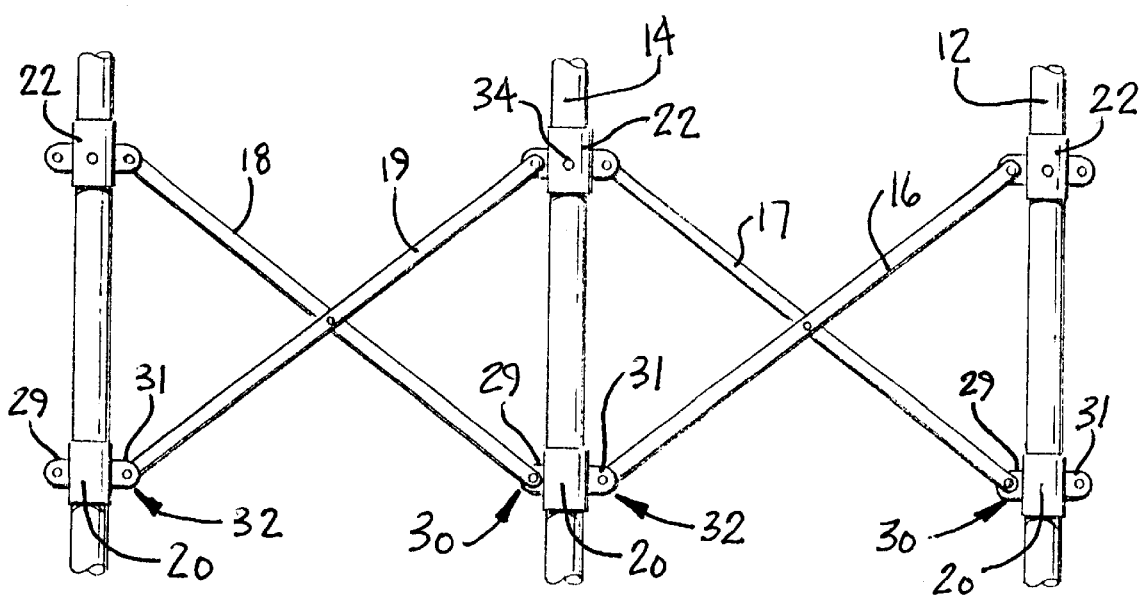
FIG. 4 is a side view of the reliable retractable and extendable protective cover assembly as viewed from direction labeled 'A' in FIG. 3. This view shows the three adjacent frame members, the linkage arrangement between the frame members, and the fixed and movable brackets of each of the frame members.

The adjacent (neighboring) frame members 12, 14 and 28; the movable and fixed brackets 20, 22, respectively; and the linkages 16, 17, 18, 19 are shown in detail in FIG. 4 (FIG. 4 is a side view of FIG. 3 viewed from the direction labeled 'A'). As mentioned above, the linkages 16 and 18 are connected at one end to fixed brackets 22 of frame members 12 and 28 respectively. The other end of the linkages 16 and 18 are connected, via bolts or rivets, to the ears 29 and 31 of the movable bracket 20 located on frame member 14. The pivot points 30 and 32 on the ears 29 and 31, respectively, accommodate angular movement of linkages 16 and 18 accompanying the linear movement of the movable bracket 20 along the length of the frame member 14 as the assembly is opened and closed. A similar description applies in relation with the other frame members, such as, 12 and 28.

Now referring to FIG. 5, one of the frame members 12 in the reliable retractable and extendable protective cover assembly is shown along with rollers 40 on both sides of the frame member. The rollers 40 are shown located within guide tracks 24. The frame member 12 is shown in guided engagement with the rollers 40 through frame support bracket assemblies 26 and fasteners 42. The frame support bracket assemblies 26 overlie support members 36 and the tracks 24. The tracks 24 are fastened to the support members 36 through fasteners 44. The support members 36 are bolted via fasteners 46 to the top 38 of the side wall members 52 of the truck bed 50. This positioning of the tracks inside and adjacent the top of the sides of the truck bed provides protection to the tracks from environmental hazard external to the pick-up truck.

FIG. 6 is a fragmentary cross-sectional view illustrating two rollers 40 in guided engagement with one end of a frame member 12 via a frame support bracket assembly 26 to which the rollers are mounted.

Figure 7:
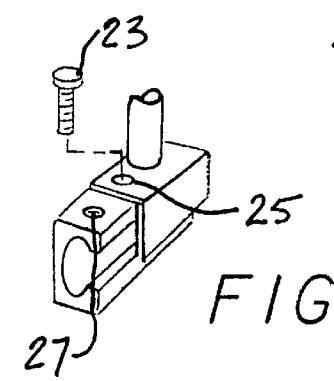
FIG. 7 is a perspective view of a locking arrangement included in the cover assembly.

A locking arrangement for the protective cover assembly is depicted in FIG. 7. Fasteners 23, that could either be threaded bolts or locking pins, may be engaged at each corner of the cover assembly. At the rear corners of the cover assembly matching threaded holes 25 and 27 are located on the frame support bracket 26 and on the guide track 24 as shown. The fasteners 23 at the front corners of the cover assembly toward the cab of the pick-up truck may also be threaded bolts. Instead of using threaded bolts which thread into both the frame support bracket and the track, the fasteners may be threaded into only one of either the frame bracket or the track, or they may merely be unthreaded pins, optionally provided with snap resilient retention springs.

The cover assembly can be collapsed by removing the fasteners 23 at the rear end or the front end or at both ends. Furthermore, when all the fasteners are removed, the cover assembly can be collapsed and easily slid off the guide tracks for storage.

In closing, it is noted that specific illustrative embodiments of the invention have been disclosed herein above. However, it is to be understood that the invention is not limited to these specific embodiments. Various alternative arrangements may be employed without departing from the spirit and scope of the invention. Thus by way of example and not of limitation, (a) the shapes of the frame members need not be as depicted in the figures, (b) the number of rollers in guided engagement with each of the frame member may be different. Thus, it is to be understood that all matters herein set forth or shown in the accompanying drawings are to be interpreted as illustrative and not in any limiting sense.

What is claimed is:

1. A track and roller assembly for a retractable and extendable protective cover assembly for covering a bed of a pick-up truck, the assembly comprising:

a pair of oppositely located and upwardly extending sides on a bed of a pick-up truck;

a pair of guide tracks being disposed in a substantially parallel formation relative to each other, said guide tracks extending along and being located inside and adjacent the top of said sides of the truck bed, the guide track being substantially below in elevation relative to the top of the sides of the bed;

a plurality of rollers positioned within each of the guide tracks, each of the plurality of rollers having an axis of rotation substantially parallel to the bed of the pick-up truck;

each of said rollers being movably engaged to each of a plurality of frame members of a retractable and extendable protective cover assembly;

at least three of the plurality of frame members, including a front frame member and a rear frame member, having each of their ends coupled to at least two of said rollers through brackets;

front and rear ends of said tracks having vertically oriented holes therethrough;

the brackets associated with the front and rear frame members having vertically extending holes therethrough, aligned with said track holes when the cover assembly is fully extended; and four pins extending through said track holes and said bracket holes when said cover is extended;

whereby removal of said four pins permits quick removal of said cover assembly.

2. A track and roller assembly for a retractable and extendable protective cover assembly for covering a bed of a pick-up truck as defined in claim 1, wherein each of the guide tracks have recesses for receiving the rollers.

3. A track and roller assembly for a retractable and extendable protective cover assembly for covering a bed of a pick-up truck as defined in claim 1, wherein the plurality of frame members extend from the front of the truck bed to the rear of the truck bed when extended.

4. A track and roller assembly for a retractable and extendable protective cover assembly for covering a bed of a pick-up truck as defined in claim 1, wherein the recessed tracks are mounted to the sides of the truck by a plurality of support members, and each of a plurality of frame support bracket assemblies has secured thereto at each end thereof a pair of said rollers riding in said tracks.

5. A track and roller assembly for a retractable and extendable protective cover assembly for covering a bed of a pick-up truck as defined in claim 1, wherein each of the frame members has a fixed bracket and a movable bracket mounted thereon.

6. A track and roller assembly for a retractable and extendable protective cover assembly for covering a bed of a pick-up truck as defined in claim 5, wherein a pair of linkages are connected to opposite sides of the movable bracket of the frame member in a substantially force balanced configuration.

7. A track and roller assembly for a retractable and extendable protective cover assembly for covering a bed of a pick-up truck, the assembly comprising:

a pair of oppositely located and upwardly extending sides on a bed of a pick-up truck;

a pair of guide tracks being disposed in a substantially parallel formation relative to each other, said guide tracks extending along and being located inside and adjacent the top of said sides of the truck bed, the guide track being substantially below in elevation relative to the top of the sides of the bed;

a plurality of rollers positioned within each of the guide tracks, each of the plurality of rollers having an axis of rotation substantially parallel to the bed of the pick-up truck;

wherein each of the guide tracks have recesses for receiving the rollers;

wherein each of the recessed guide tracks are mounted to the sides of the truck by a plurality of track support members, each of the plurality of track support members being substantially L-shaped and having substantially vertical and substantially horizontal legs;

each of the recessed guide tracks being secured to the substantially vertical leg of the substantially L-shaped track support member and the substantially horizontal leg of the track support member extending over and being secured to the top of the sides of the bed of the pick-up truck;

each of said rollers being movably engaged to each of a plurality of frame members of a retractable and extendable protective cover assembly; and whereby upon activating the cover assembly, the displacement of the frame members accompany the movement of the rollers inside the tracks.

* * * * *